(12) United States Patent
Down et al.

(10) Patent No.: US 7,576,459 B2
(45) Date of Patent: Aug. 18, 2009

(54) ELECTRIC MACHINE WITH FLUID SUPPLY CONTROL SYSTEM

(75) Inventors: Edward M. Down, Tucson, AZ (US); David C. Hodge, Oro Valley, AZ (US); Wayne T. Pearson, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 431 days.

(21) Appl. No.: 11/526,919

(22) Filed: Sep. 25, 2006

(65) Prior Publication Data

US 2008/0073984 A1 Mar. 27, 2008

(51) Int. Cl.
*H02K 9/00* (2006.01)
(52) U.S. Cl. .............................. 310/58; 310/52; 310/54; 310/68 B
(58) Field of Classification Search .................... 310/52, 310/54, 58, 68 C, 53
See application file for complete search history.

(56) References Cited

U.S. PATENT DOCUMENTS

| 853,263 | A | | 5/1907 | Randall | |
|---|---|---|---|---|---|
| 2,807,772 | A | * | 9/1957 | Melentine | ..................... 322/50 |
| 2,975,308 | A | | 3/1961 | Kilbourne et al. | |
| 3,241,331 | A | | 3/1966 | Endress et al. | |
| 3,755,702 | A | | 8/1973 | Willyoung | |
| 5,121,341 | A | | 6/1992 | McCabria et al. | |
| 5,698,912 | A | | 12/1997 | Rasch et al. | |
| 5,770,899 | A | * | 6/1998 | Hayashi | ........................ 310/12 |
| 6,324,858 | B1 | | 12/2001 | Holden | |
| 6,583,525 | B2 | * | 6/2003 | Dyer et al. | ..................... 310/53 |
| 6,737,767 | B2 | | 5/2004 | Berggren et al. | |
| 6,750,572 | B2 | | 6/2004 | Tornquist et al. | |
| 6,914,354 | B2 | | 7/2005 | Seniawski et al. | |
| 2004/0000843 | A1 | * | 1/2004 | East | ............................ 310/331 |
| 2006/0076840 | A1 | | 4/2006 | Yamaguchi et al. | |
| 2006/0113851 | A1 | * | 6/2006 | Ishihara et al. | ................. 310/52 |

FOREIGN PATENT DOCUMENTS

| DE | 43 33 613 A1 | 4/1994 |
|---|---|---|
| DE | 43 23 205 C1 | 10/1994 |
| WO | WO 03/075435 A1 | 9/2003 |

OTHER PUBLICATIONS

European Search Report dated Feb. 4, 2008.

* cited by examiner

*Primary Examiner*—Quyen Leung
*Assistant Examiner*—Leda Pham
(74) *Attorney, Agent, or Firm*—Oral Caglar, Esq.

(57) ABSTRACT

An electric machine includes a fluid control system that is configured to regulate the flow rate of fluid to the electric machine. The machine includes a sensor that senses a parameter representative of cooling required by the machine. The sensor supplies a sensor signal to a control unit, which in turn supplies a flow control signal to a flow regulator. The flow regulator, in response to the flow control signal, controls the flow rate of fluid to the machine to what is needed for effective cooling at current operating conditions. As a result, windage losses and pumping power requirements in the machine are reduced, and machine efficiency is increased.

19 Claims, 2 Drawing Sheets

ELECTRIC MACHINE WITH FLUID SUPPLY CONTROL SYSTEM

TECHNICAL FIELD

The present invention relates to electric machines and, more particularly, to an electric machine including a fluid supply control system.

BACKGROUND

An aircraft may include various types of rotating electric machines such as, for example, generators, motors, and motor/generators. Many of these electric machines include various mechanical components that rotate, and may thus be supplied with lubricant. In addition, some of the components within these machines may generate heat due to either, or both, frictional losses and electrical losses, and thus may be supplied with a cooling medium. The lubricating and cooling media may be supplied from a single system that supplies a fluid, such as oil, that acts as both a lubricating and a cooling medium. As may be appreciated, the heat produced in an electric machine may be related to the output of the machine. This machine output can be independent of its rotational speed, and is typically less than the maximum output capability of the machine for most of machine operating cycles.

Many present lubricating and cooling systems are configured to either supply a relatively constant fluid flow rate to its associated electrical machine, or a fluid flow rate that varies directly with electric machine rotational speed. Moreover, these systems are typically designed for maximum machine output and losses under all operating conditions. Although generally safe, reliable, and operationally robust, this configuration does exhibit certain drawbacks. Namely, this can result in relatively high flow rates into and through the electric machine than what may be needed for most machine operating cycles, and thus can result in relatively higher windage losses and pumping power requirements, and lower machine efficiency.

Hence, there is a need for a fluid supply control system for electric machines, such as aircraft motors, generators, and starter-generators that regulates the flow rate of fluid into and through the electric machines to only what may be needed for present machine operating conditions and/or reduces windage losses and/or pumping power requirements in the electric machines and/or increases machine efficiency. The present invention addresses at least these needs.

BRIEF SUMMARY

The present invention provides an electric machine that includes a fluid supply control system configured to regulate the flow rate of fluid to the electric machine to only what is needed for effective cooling, and thereby reduce windage losses and pumping power requirements, and increases machine efficiency. Overall system size and weight may also be reduced.

In one embodiment, and by way of example only, an electric machine includes a housing, a main rotor assembly, a main stator assembly, a sensor, a fluid supply conduit, a fluid return conduit, a control unit, and a fluid flow regulator. The housing defines at least a portion of an internal fluid circuit. The main rotor assembly is rotationally mounted within the housing, and the main stator assembly is mounted within the housing and at least partially surrounding at least a portion of the main rotor assembly. The sensor is disposed within the housing and is configured to sense a parameter representative of a cooling requirement of the machine and to supply a sensor signal representative thereof. The fluid supply conduit is coupled to the housing and includes a fluid inlet and a fluid outlet. The fluid supply conduit fluid inlet is coupled to receive a flow of fluid, and the fluid supply conduit fluid outlet is in fluid communication with the internal fluid circuit. The fluid return conduit is coupled to the housing and includes a fluid inlet and a fluid outlet. The fluid return conduit fluid inlet is in fluid communication with the internal fluid circuit. The control unit is coupled to receive the sensor signal and is operable, in response thereto, to supply a fluid flow control signal based on the sensed parameter. The fluid flow regulator is in fluid communication with the fluid supply conduit fluid inlet, and is coupled to receive the fluid flow control signal. The fluid flow regulator is operable, in response to the fluid flow control signal, to control the flow of fluid into the fluid supply conduit to a minimum fluid flow rate, a maximum fluid flow rate, or one of a plurality of fluid flow rates between the minimum and maximum fluid flow rates.

In another exemplary embodiment, the fluid flow regulator is a pump, and in yet another exemplary embodiment the fluid flow regulator is a valve.

Other independent features and advantages of the preferred electric machine and fluid flow control system will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, although the electric machine is described herein as being implemented as a brushless starter-generator, and as being used with, for example, an aircraft gas turbine engine, it will be appreciated that may the electric machine may be implemented as any one of numerous types of electric motors, generators, or motor/generators. Moreover, if implemented as a starter-generator, it will be appreciated that it may be used as a starter-generator with for various types of engines in numerous other environments including, for example, space, marine, land, or other vehicle-related applications where engines are used.

Figure 1:
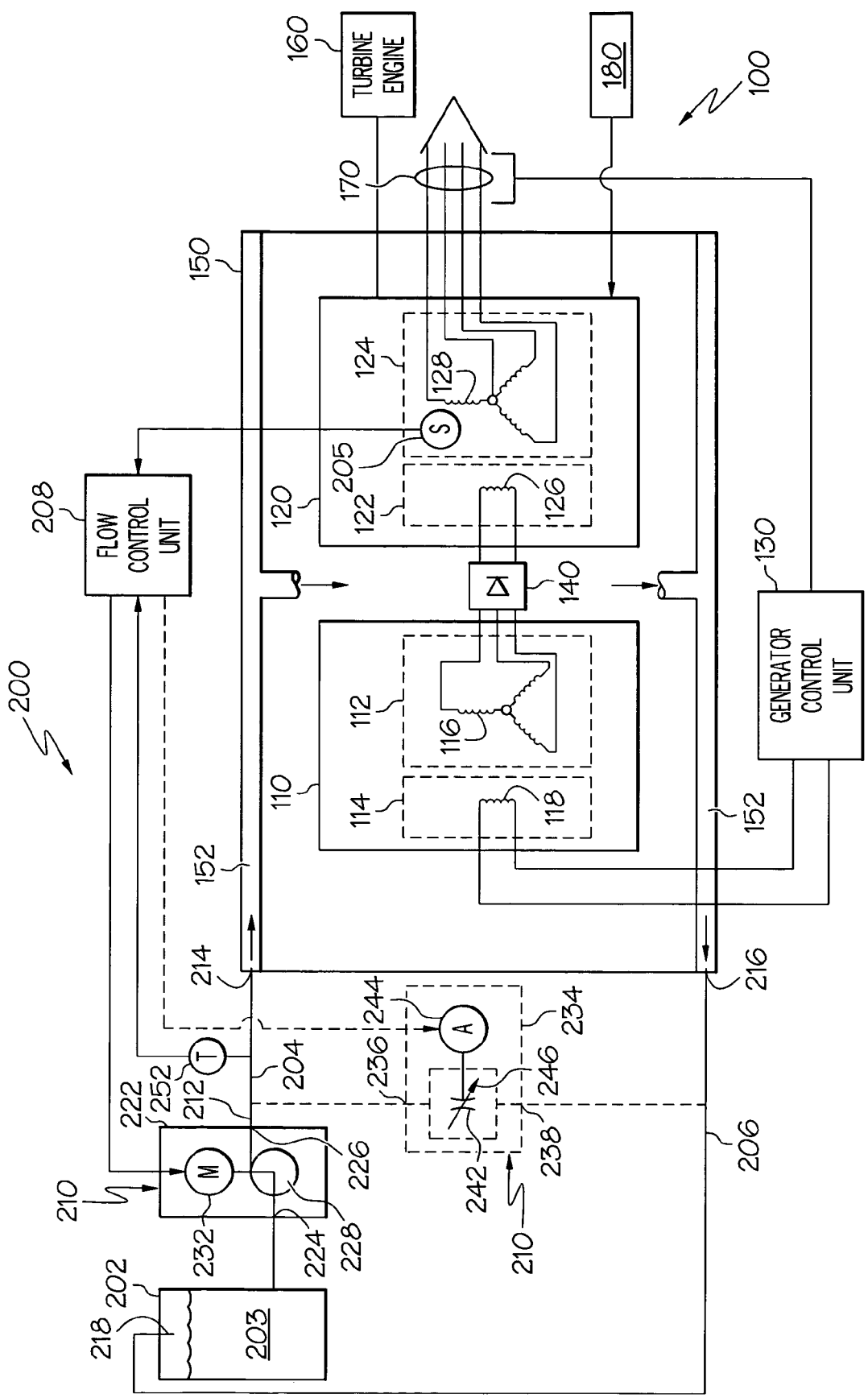
FIG. 1 is a functional schematic diagram of an exemplary electrical machine that includes a fluid flow control system according to an embodiment of the present invention.

Turning now to FIG. 1, a functional schematic diagram of an exemplary starter-generator system 100 for use with, for example, an aircraft gas turbine engine, is depicted. This exemplary starter-generator system 100 includes an exciter 110, which includes an exciter rotor 112 and an exciter stator 114, a main starter-generator 120, which includes a main rotor 122 and a main stator 124, a generator control unit 130, and one or more a rectifier assemblies 140. Preferably, at least the exciter 110, the main starter-generator 120, and the rectifier assemblies 140 are all mounted within a housing 150. It will be appreciated that the starter-generator system 100 may include one or more additional components, sensors, or controllers such as, for example, a permanent magnet generator (PMG), or a rotational speed sensor. However, a description of these additional components, sensors, and controllers, if included, is not needed, and will therefore not be further depicted or described.

In the depicted embodiment, the exciter rotor 112 has a set of multi-phase (e.g., three-phase) exciter armature windings 116 wound thereon, the exciter stator 114 has one or more exciter field windings 118 wound thereon, the main rotor 122 has one or more main field windings 126 wound thereon, and the main stator 124 has a multi-phase (e.g., three-phase) stator winding set 128 wound thereon. When the starter-generator system 100 is operating in a generator mode, the exciter rotor 112 and the main rotor 122, both of which are configured to rotate, are supplied with a rotational drive force from, for example, an aircraft gas turbine engine 160, and thus rotate, preferably at the same rotational speed. The rotational speed of the engine 160, and thus these starter-generator system components, may vary. For example, the rotational speed may vary in the range of about 12,000 rpm to about 24,000 rpm. It will be appreciated that this rotational speed range is merely exemplary, and that various other speed ranges may be used.

No matter the specific rotational speed range, it will be appreciated that when the starter-generator system 100 is operating in the generator mode, the generator control unit 130 supplies DC power to the exciter field winding 118. As the exciter rotor 122 rotates, AC currents are induced in the exciter armature windings 116. The rectifier assemblies 140, which are electrically coupled between the exciter armature windings 116 and the main field windings 126, rectify the AC currents and supply DC current to the main field windings 126. As the main field windings 126 rotate, AC power is generated in the stator winding set 128. The AC power is supplied to an AC power bus 170.

When the starter-generator system 100 is operating in the motor mode, AC power is supplied to the exciter stator 114, and to the stator winding set 128. In the depicted embodiment, the control unit 130 supplies the AC power to the exciter stator 114, and AC power from, for example, the AC power bus 170 is supplied to the stator winding set 128. It will be appreciated that the AC power supplied to the stator winding set 128 is of a controlled frequency, phase, and amplitude and is thus preferably supplied via, for example, a non-illustrated inverter. This inverter may be disposed in any one of numerous locations and/or devices, but is preferably disposed within the generator control unit 130.

Figure 2:
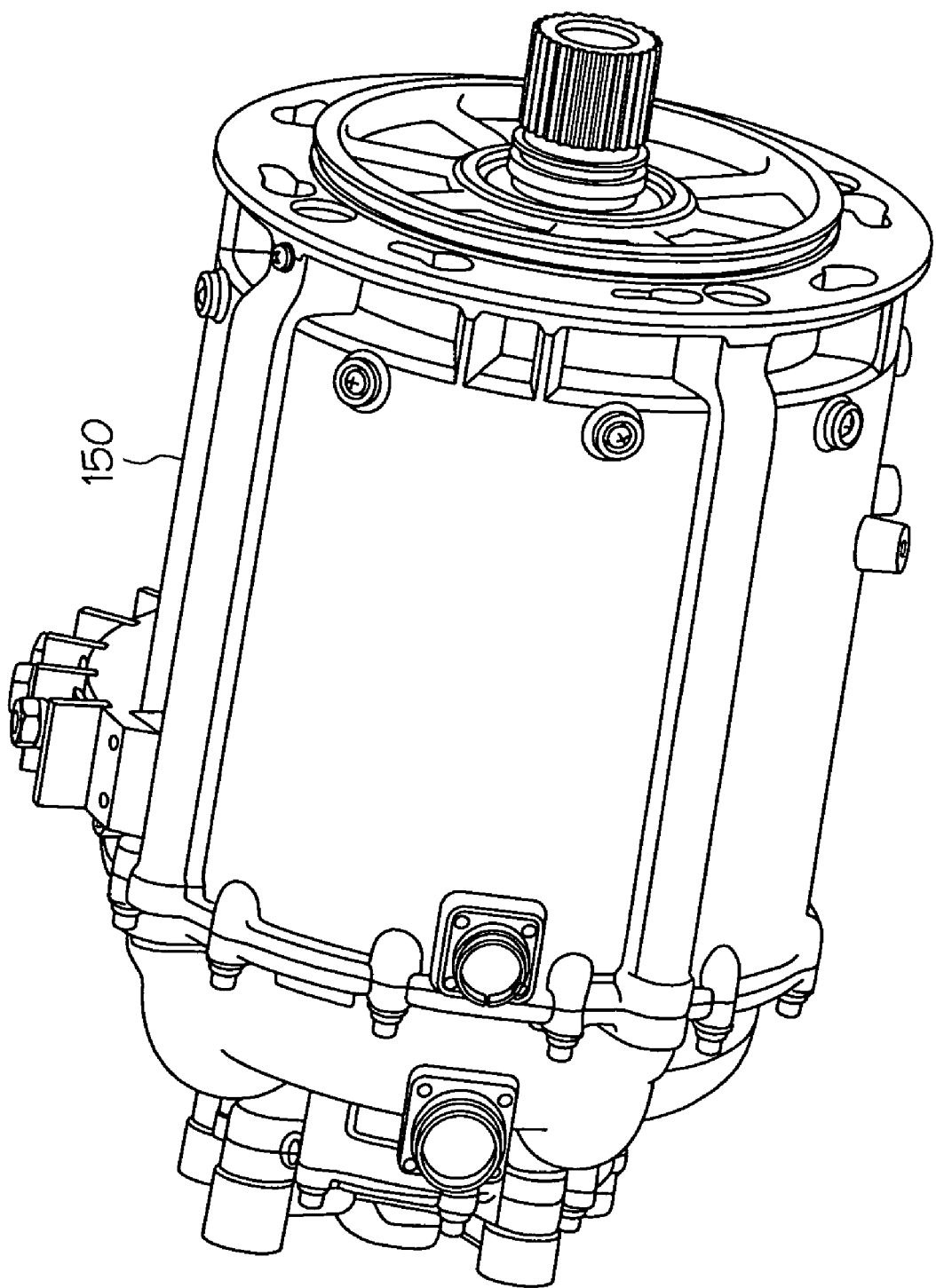
FIG. 2 is a perspective view of a physical embodiment of the electrical machine depicted in FIG. 1.

The AC power supplied to the stator winding set 128, as is generally known, generates a rotating magnetic field in the stator winding set 128, which interacts with currents induced in the main field windings 126 supplied from the exciter 110, generating a torque and causing the main rotor 122 to rotate and supply rotational power to the engine 160. As noted above, a non-illustrated position sensing device, such as a resolver unit, may also be included in the system 100 to supply a signal representative of the main rotor 122 position to the control unit 130. This position signal is used to control the current supplied to the stator winding set 128 such that the maximum torque is generated. It will be appreciated, however, that the position sensing device need not be included in the starter-generator system 100. Instead, the position signal may be produced using a PMG or a sensorless method, in which rotor position is derived from various electrical signals in the starter-generator system 100. A perspective view of an exemplary physical embodiment of at least those portions of the starter-generator system 100 that are mounted within the housing 150 is illustrated in FIG. 2.

Portions of the exciter 110 and main starter-generator 120, as noted above, rotate during operation. Moreover, these components, as well as the rectifier assemblies 140 and other non-illustrated electrical components and devices within the housing 150, generate heat due to frictional and/or electrical losses during operation. As such, and as FIG. 1 further depicts, a lubrication and cooling system 200 is coupled to the starter-generator 100 to provide both lubrication and cooling to various internal components within the housing 150. Although for clarity the lubrication and cooling system 200 is depicted separate from the housing 150, it will be appreciated some or all of the system 200 could be disposed within or on the housing 150. The lubrication and cooling system 200 includes a reservoir 202, a fluid supply conduit 204, a fluid return conduit 206, a sensor 205, a flow control unit 208, and a flow regulator 210. The reservoir 202 preferably contains a volume of fluid 203 that is used to both lubricate and cool components within the generator housing 150. It will be appreciated that the fluid 203 may be any one of numerous suitable fluids, but in a particular preferred embodiment, the fluid 203 is oil or other suitable lubricant.

The fluid supply conduit 204 is coupled to the housing 150 and includes at least an inlet 212 and an outlet 214. The fluid supply conduit inlet 212 is coupled to receive a flow of fluid 203, and the fluid supply conduit outlet 214 is in fluid communication with an internal fluid circuit 152 that is at least partially formed in the housing 150. The fluid return conduit 206 is also coupled to the housing 150, and includes at least an inlet 216 and an outlet 218. The fluid return conduit inlet 216 is in fluid communication with the internal fluid circuit 152, and the fluid return conduit outlet 218 is in fluid communication with the reservoir 202. As will be described in more detail further below, fluid 203 from the reservoir 202 is directed into the fluid supply conduit 204, which directs the fluid 203 into the internal fluid circuit 152. After flowing through the internal fluid circuit 152, the fluid 203 is directed out of the housing 150 and into the fluid return conduit 206, which returns the fluid 203 to the reservoir 202.

Before proceeding further, it will be appreciated that the lubrication and cooling system 200 could additionally include one or more non-illustrated valves, one or more non-illustrated filters, and/or one or more non-illustrated heat exchangers to remove heat from the fluid 203 before being supplied to, or after being discharged from, the housing 150. It will additionally be appreciated that for clarity and ease of description, the internal fluid circuit 152 is not depicted or further described herein, and may be implemented according to any one of numerous configurations. One exemplary configuration that may be used is disclosed in U.S. Pat. No. 6,750,572, entitled "Generator with Improved Lubrication and Cooling System," which is assigned to the assignee of the instant application.

Returning once again to the description, it is seen that the sensor 205 is disposed within the housing 150. The sensor 205 is configured to sense a parameter that is at least representative of the cooling that is required by the starter-generator 100, and to supply a sensor signal representative thereof to the control unit 208. Although the sensor 205 could be implemented using any one of numerous types of sensing devices that could sense any one of numerous parameters representative of the required cooling, in the depicted embodiment a temperature sensor is used. In particular, the temperature sensor 205 is configured to sense the temperature of the stator winding set 128, as this temperature will vary with the amount of power being supplied by the starter-generator 100 in both the generator mode and the motor mode. It will be appreciated, however, that this is merely exemplary and that the particular temperature being sensed may vary. It will additionally be appreciated that the type of temperature sensor 205 may vary. For example, the temperature sensor 205 could be implemented using any one of numerous types of resistance temperature detectors, thermocouples, semiconductor temperature sensors, or optical temperature sensors. Moreover, a plurality of sensors and/or parameters representative of the cooling required by the starter-generator 100 could also be used.

No matter the specific parameter that is sensed, and the specific number and type of sensor that is used, the sensor 205 (or sensors), as noted above, supplies a sensor signal representative of the cooling required by the starter-generator 100 to the flow control unit 208. As may be appreciated, the flow rate of fluid 203 that is needed to sufficiently cool the starter-generator 100 will vary with, for example, the amount of power that the starter-generator 100 is supplying in both the motor mode and the generator mode, and also with the particular point in time in the particular operating cycle. For example, for a given power output, the machine 100 may not require as much cooling during initial machine startup as compared to later on in the operational cycle. Thus, the flow control unit 208, in response to the sensor signal, determines the flow rate of fluid 203 that will provide sufficient cooling of the starter-generator 100. Based on this determination, the control unit supplies a flow control signal to the flow regulator 210. The flow regulator 210, embodiments of which will now be described, is responsive to the flow control signal to control the flow of fluid 203 into the fluid supply conduit 204, and thus into and through the starter-generator 100. It will be appreciated that although the flow control unit 208 is depicted and described herein as being separate from the generator control unit 130, it could be implemented as part of the generator control unit 130, and vice-versa.

The flow regulator 210 may be implemented using any one of numerous devices and/or systems, and in accordance with any one of numerous configurations. In one exemplary embodiment, the flow regulator 210 is implemented as a variable speed pump assembly 222 that includes a fluid inlet 224, a fluid outlet 226, a pump 228, and a motor 232. The pump assembly fluid inlet 224 is in fluid communication with the reservoir 202, and the pump assembly fluid outlet 226 is in fluid communication with the fluid supply conduit fluid inlet 212. The motor 232 is coupled to supply a drive force to the pump 228, and is further coupled to receive the flow control signals supplied by the control unit 208. The motor 232, in response to the flow control signals, supplies a drive force to the pump 228. The pump 228, in response to the supplied drive force, draws fluid 203 from the reservoir 202 and supplies the fluid 203, to the fluid supply conduit inlet 212, and thus to the starter-generator 100, at a flow rate sufficient to cool and lubricate the starter-generator 100 for the power the starter-generator 100 is delivering. It will be appreciated that the pump 228 and motor 232 may be implemented using any one of numerous types of pumps and motors, but in a particular preferred embodiment the pump 228 is a gerotor pump, and the motor 232 is a brushless permanent magnet machine. It will additionally be appreciated that in an alternative embodiment the flow regulator 210 could be implemented as a variable displacement pump.

It is further noted that the system 200 could additionally include one or more fluid temperature sensors, such as the temperature sensor 252 that is depicted in FIG. 1. The fluid temperature sensor 252, if included, is operable to sense the temperature of the fluid 203 and supply a fluid temperature signal representative thereof to the flow control unit 208. The flow control unit 208 determines the flow rate of fluid 203 that will provide sufficient cooling of the starter-generator 100, and supplies the flow control signal to the flow regulator 210, in response to both the sensor signal and the fluid temperature signal. In such an embodiment, it will be appreciated that for a given cooling requirement, the flow of fluid 203 to the machine will be less for a relatively lower fluid temperature, and more for a relatively higher fluid temperature. Although the fluid temperature sensor is depicted as sensing fluid temperature at the discharge of the flow regulator, this is merely exemplary and could be disposed elsewhere in the system 200.

In another embodiment, the flow regulator 210, rather than being implemented as a pump, is implemented as a flow control valve 234. In such an embodiment, as depicted in phantom in FIG. 1, the flow control valve 234 is coupled between the fluid supply conduit 204 and the fluid return conduit 206. It will be appreciated that with this embodiment the lubrication and cooling system 200 may still include a pump, which may be a variable speed or variable displacement pump. However, the pump, if it is variable speed or displacement, does not receive, and its speed or displacement is thus not varied in response to, the flow control signal from the flow control unit 208. Rather, its speed or displacement may vary directly with the rotational speed of the pump drive.

It will be appreciated that the flow control valve 234 may be implemented using any one of numerous valves and configurations. In the depicted embodiment, however, the flow control valve 234 includes at least a fluid inlet 236, a fluid outlet 238, a variable area flow orifice 242, and a valve actuator 244. The valve fluid inlet 236 is in fluid communication with fluid supply conduit 204, the valve fluid outlet 238 is in fluid communication with the fluid return conduit 206, and the variable area flow orifice 242 is disposed between, and is in fluid communication with, the valve fluid inlet 236 and the valve fluid outlet 238. Thus, flow through the flow control valve 234 is regulated by controlling the area of the variable area flow orifice 242.

The variable area flow orifice 242 may be implemented using any one of numerous devices, in any one of numerous configurations. In a particular preferred embodiment, however, the variable area flow orifice 242 includes a movable valve element 246 that, based on its position, controls the area of the variable area flow orifice 242, and thus the flow rate of fluid 203 through the flow control valve 234. It is seen that the valve actuator 244 is coupled to the movable valve element 246, and is also coupled, in this alternative embodiment, to receive the flow control signal from the control unit 208. The valve actuator 244, in response to the flow control signal, moves the valve element 246, thereby controlling the area of the variable area flow orifice 242, and thus the flow rate of fluid 203 through the flow control valve 234 and into and through the housing 150.

As may be appreciated from the depicted configuration, when the control unit 208 determines that the flow rate of fluid 203 into and through the housing 150 should increase, the flow control signal it sends to the valve actuator 244 causes the valve actuator 244 to move the valve element 246 such that the area of the variable area flow orifice 238 decreases. As a result, relatively less fluid 203 flows through the flow control valve 234, which means relatively more fluid 203 is directed into and through the housing 150. Conversely, when the control unit 208 determines that the flow rate of fluid 203 into and through the housing 150 should decrease, the flow control signal it sends to the valve actuator 244 causes the valve actuator 244 to move the valve element 246 such that the area of the variable area flow orifice 238 increases. As a result, relatively more fluid 203 flows through the flow control valve 234, which means relatively less fluid 203 is directed into and through the housing 150.

It will be appreciated that in yet another alternative embodiment, the flow regulator 210 is implemented with both the variable speed pump 222 and the flow control valve 234, each of which is coupled to receive the same or independent flow control signals from the flow control unit 208. In this embodiment, the variable speed pump 222 and flow control valve 234 work together to provide the desired fluid flow rate into and through the housing 150.

The fluid control system 200 depicted herein and described above provides improved control of fluid into and through electrical machines. The system 200 provides a more continuous control of fluid flow rate through the electrical machines to only what may be needed for present machine operating conditions. Controlling the flow rate of fluid into and through electric machines in this manner, reduces windage losses and overall pumping power required in the electric machines, and increases machine efficiency.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electric machine, comprising:
   a housing defining at least a portion of an internal fluid circuit;
   a main rotor assembly rotationally mounted within the housing;
   a main stator winding set mounted within the housing and at least partially surrounding at least a portion of the main rotor assembly;
   a temperature sensor disposed within the stator winding set and configured to sense a parameter representative of an amount of power passing through the stator winding set and to supply a sensor signal representative thereof;
   the temperature sensor positioned externally of the fluid circuit;
   a fluid supply conduit coupled to the housing and including a fluid inlet and a fluid outlet, the fluid supply conduit fluid inlet coupled to receive a flow of fluid, the fluid supply conduit fluid outlet in fluid communication with the internal fluid circuit;
   a fluid return conduit coupled to the housing and including a fluid inlet and a fluid outlet, the fluid return conduit fluid inlet in fluid communication with the internal fluid circuit;
   a control unit coupled to receive the sensor signal and operable, in response thereto, to supply a fluid flow control signal based on the sensed parameter; and
   a fluid flow regulator in fluid communication with the fluid supply conduit fluid inlet, the fluid flow regulator coupled to receive the fluid flow control signal and operable, in response thereto, to control the flow of fluid into the fluid supply conduit to a minimum fluid flow rate, a maximum fluid flow rate, or one of a plurality of fluid flow rates between the minimum and maximum fluid flow rates.

2. The machine of claim 1, wherein the fluid flow regulator comprises a pump.

3. The machine of claim 2, wherein:
   the pump includes a fluid inlet and a fluid outlet;
   the pump fluid inlet is adapted to couple to a fluid reservoir; and
   the pump fluid outlet is in fluid communication with the fluid supply conduit fluid inlet.

4. The machine of claim 3, further comprising:
   the fluid reservoir having fluid stored therein and in fluid communication with the pump fluid inlet and the fluid return conduit.

5. The machine of claim 2, wherein the pump is a variable speed pump that includes a variable speed motor coupled to receive the fluid flow control signal.

6. The machine of claim 1, wherein the fluid flow regulator comprises a valve including a fluid inlet, a fluid outlet, and a variable area flow orifice between the fluid inlet and fluid outlet.

7. The machine of claim 6, wherein:
   the valve fluid inlet is coupled to the fluid supply conduit; and
   the valve fluid outlet is in fluid communication with the fluid return conduit.

8. The machine of claim 7, further comprising:
   a fluid reservoir having fluid stored therein and in fluid communication with the valve fluid inlet and the fluid return conduit.

9. The machine of claim 6, further comprising:
   a valve actuator coupled to receive the fluid flow control signal and operable, in response thereto, to control fluid flow through the variable area flow orifice.

10. The machine of claim 1, further comprising:
    a fluid temperature sensor operable to sense a temperature of the fluid and to supply a fluid temperature signal representative thereof to the control unit,
    wherein the control unit is further operable to supply the fluid flow control signal based on the sensed parameter and the fluid temperature signal.

11. The machine of claim 1, wherein the rotor assembly comprises at least a portion of the internal fluid circuit.

12. The machine of claim 1, wherein the fluid comprises a lubricant.

13. An electric machine, comprising:
    a housing defining at least a portion of an internal fluid circuit;
    a main rotor assembly rotationally mounted within the housing;
    a main stator assembly mounted within the housing and at least partially surrounding at least a portion of the main rotor assembly;
    a first sensor disposed within the stator assembly and configured to sense a parameter representative of an amount of power passing through the stator assembly and to supply a first sensor signal representative thereof;
    a fluid supply conduit coupled to the housing and including a fluid inlet and a fluid outlet, the fluid supply conduit fluid inlet coupled to receive a flow of fluid, the fluid supply conduit fluid outlet in fluid communication with the internal fluid circuit;
    a second sensor disposed within the fluid supply conduit to sense temperature of fluid in the fluid supply conduit and to supply a second sensor signal representative thereof;
    a fluid return conduit coupled to the housing and including a fluid inlet and a fluid outlet, the fluid return conduit fluid inlet in fluid communication with the internal fluid circuit;

a control unit coupled to receive the first and the second sensor signals and operable, in response thereto, to supply the fluid flow control signal based on the sensed parameter; and a pump in fluid communication with the fluid supply conduit fluid inlet, the variable speed pump coupled to receive the fluid flow control signal and operable, in response thereto, to control the flow of fluid into the fluid supply conduit to a minimum fluid flow rate, a maximum fluid flow rate, or one of a plurality of fluid flow rates between the minimum and maximum fluid flow rates.

14. The machine of claim 13, wherein:

the pump includes a fluid inlet and a fluid outlet;

the pump fluid inlet is adapted to couple to a fluid reservoir; and the pump fluid outlet is in fluid communication with the fluid supply conduit fluid inlet.

15. The machine of claim 13, further comprising:

a fluid temperature sensor operable to sense a temperature of the fluid and to supply a fluid temperature signal representative thereof to the control unit, wherein the control unit is further operable to supply the fluid flow control signal based on the sensed parameter and the fluid temperature signal.

16. The machine of claim 13, wherein the pump is a variable speed pump that includes a variable speed motor coupled to receive the fluid flow control signal.

17. An electric machine, comprising:

a housing defining at least a portion of an internal fluid circuit;

a main rotor assembly rotationally mounted within the housing;

a main stator assembly mounted within the housing and at least partially surrounding at least a portion of the main rotor assembly;

a first sensor disposed within the housing and configured to sense a parameter representative of a cooling requirement of the machine and supply a first sensor signal representative thereof;

a fluid supply conduit coupled to the housing and including a fluid inlet and a fluid outlet, the fluid supply conduit fluid inlet coupled to receive a flow of fluid, the fluid supply conduit fluid outlet in fluid communication with the internal fluid circuit;

a second sensor for sensing temperature of fluid passing through the internal fluid circuit and for supplying a second sensor signal;

a fluid return conduit coupled to the housing and including a fluid inlet and a fluid outlet, the fluid return conduit fluid inlet in fluid communication with the internal fluid circuit;

a control unit coupled to receive the first and the second sensor signals and operable, in response thereto, to supply a fluid flow control signal based on the sensed parameter; and a fluid flow regulator valve in fluid communication with the fluid supply conduit fluid inlet, the fluid flow regulator valve coupled to receive the fluid flow control signal and operable, in response thereto, to control the flow of fluid into the fluid supply conduit to a minimum fluid flow rate, a maximum fluid flow rate, or one of a plurality of fluid flow rates between the minimum and maximum fluid flow rates.

18. The machine of claim 17, wherein the fluid flow regulator valve includes a fluid inlet, a fluid outlet, and a variable area flow orifice between the fluid inlet and fluid outlet; and the valve fluid inlet is coupled to the fluid supply conduit; and the valve fluid outlet is in fluid communication with the fluid return conduit.

19. The machine of claim 18, further comprising:

a valve actuator coupled to receive the fluid flow control signal and operable, in response thereto, to control fluid flow through the variable area flow orifice.

* * * * *